(12) United States Patent
Kim et al.

(10) Patent No.: US 10,833,462 B2
(45) Date of Patent: Nov. 10, 2020

(54) TRANSITION JOINT

(71) Applicant: Tai Han Electric Wire Co., Ltd., Gyeonggi-do (KR)

(72) Inventors: Hwa Jong Kim, Gyeonggi-do (KR); Hyun Joo Kim, Gyeonggi-do (KR); Han Wha Kim, Seoul (KR); Jae Hyuk Song, Chungcheongnam-do (KR); Du Hyoun Han, Seoul (KR); Dong-suk Hong, Gyeonggi-do (KR)

(73) Assignee: TAI HAN ELECTRIC WIRE CO., LTD., Gyeonggi-do (KR)

( * ) Notice: Subject to any disclaimer, the term of this patent is extended or adjusted under 35 U.S.C. 154(b) by 0 days.

(21) Appl. No.: 16/413,421

(22) Filed: May 15, 2019

(65) Prior Publication Data

US 2020/0067242 A1 Feb. 27, 2020

(30) Foreign Application Priority Data

Aug. 24, 2018 (KR) .......... 10-20018-009323

(51) Int. Cl.
| | | |
|---|---|---|
| *H01R 13/523* | (2006.01) | |
| *H01R 24/54* | (2011.01) | |
| *H01R 13/405* | (2006.01) | |
| *H01R 13/631* | (2006.01) | |
| *H01R 105/00* | (2006.01) | |

(52) U.S. Cl.
CPC ......... *H01R 24/542* (2013.01); *H01R 13/405* (2013.01); *H01R 13/6315* (2013.01); *H01R 2105/00* (2013.01)

(58) Field of Classification Search
CPC .................................................... H01R 24/542
USPC ........................................................ 174/88 R
See application file for complete search history.

(56) References Cited

U.S. PATENT DOCUMENTS

| | | | |
|---|---|---|---|
| 2007/0169954 A1* | 7/2007 | Bertini | H01R 13/5205 174/25 G |
| 2010/0186988 A1* | 7/2010 | Jeroense | H01B 7/045 174/103 |
| 2018/0163728 A1* | 6/2018 | Zugelder | H01R 13/52 |

FOREIGN PATENT DOCUMENTS

| | | |
|---|---|---|
| JP | H04-209473 A | 7/1992 |
| JP | 2008-054455 A | 3/2008 |
| JP | 4647348 B2 | 3/2011 |
| KR | 20000018253 U | 10/2000 |

* cited by examiner

*Primary Examiner* — Stanley Tso
(74) *Attorney, Agent, or Firm* — Foley & Lardner LLP

(57) ABSTRACT

A transition joint which blocks insulating oil by connecting a three core HPFF cable and a three core XLPE cable is provided. The transition joint includes three epoxy units which connect independently three first cable cores constituting the three core HPFF cable and three second cable cores constituting the three core XLPE cable, respectively. Each of the epoxy units includes a center electrode connecting an electrode of the first cable core and an electrode of the second cable core, and an epoxy molding part implemented in the form of surrounding an outer wall of the center electrode in order to block the center electrode from the insulating oil.

6 Claims, 4 Drawing Sheets

【Fig. 1a】
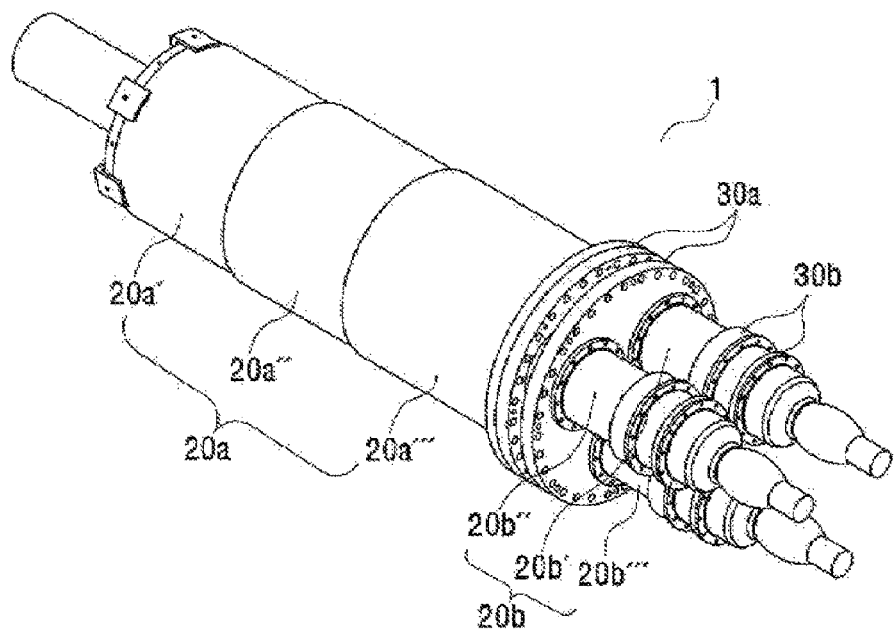
【Fig. 1b】
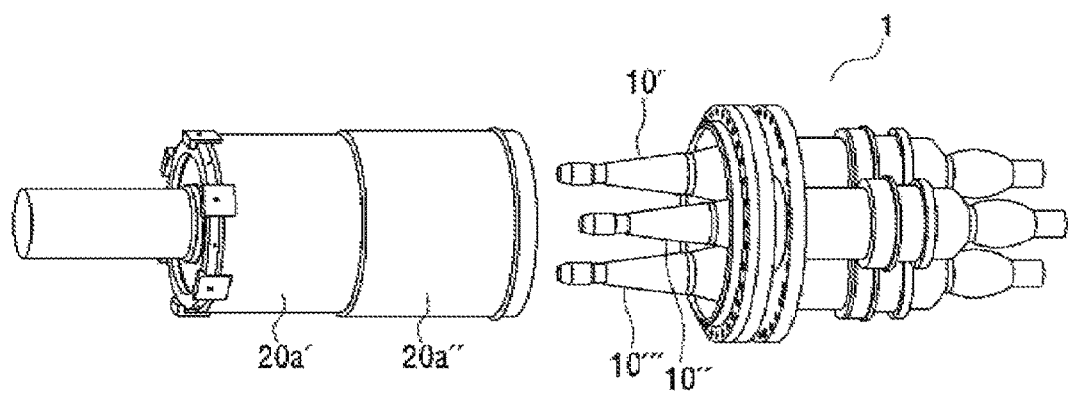

【Fig. 1c】
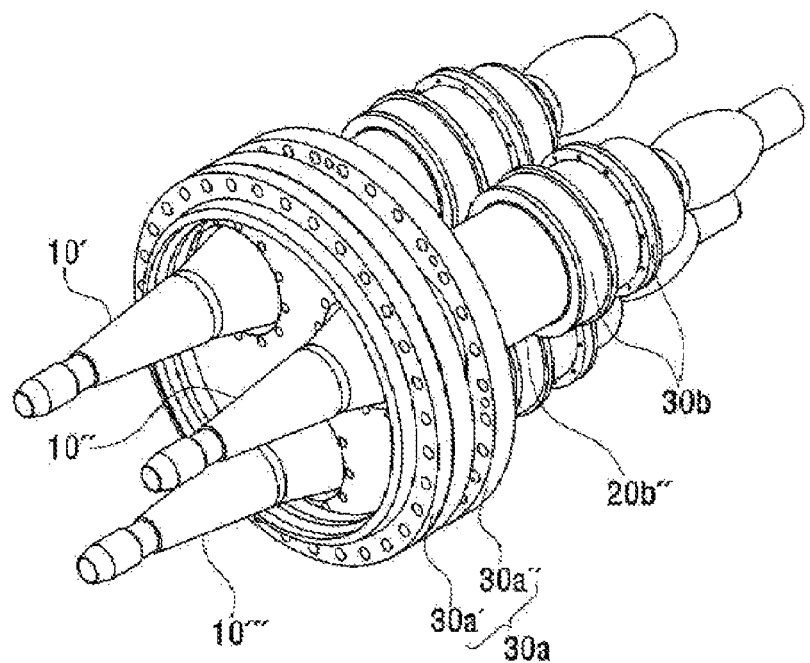
【Fig. 1d】
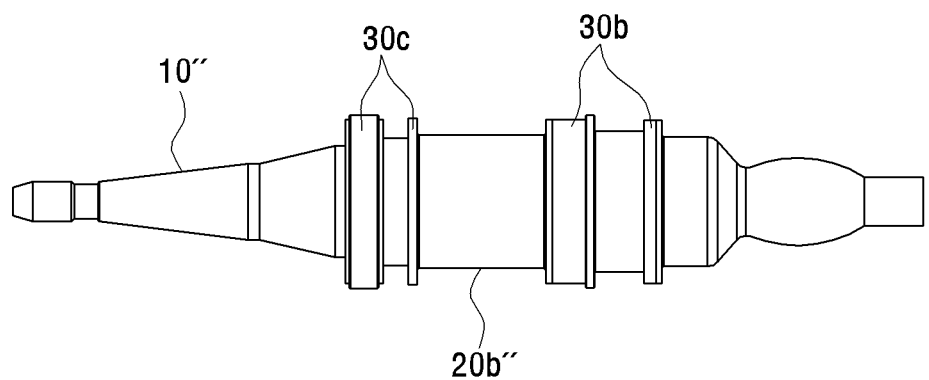

[Fig. 2a]
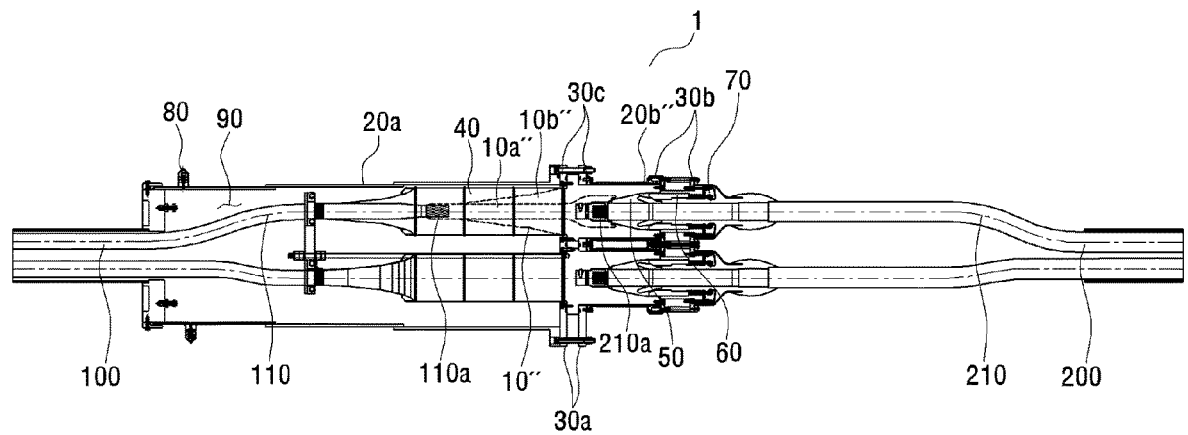
[Fig. 2b]
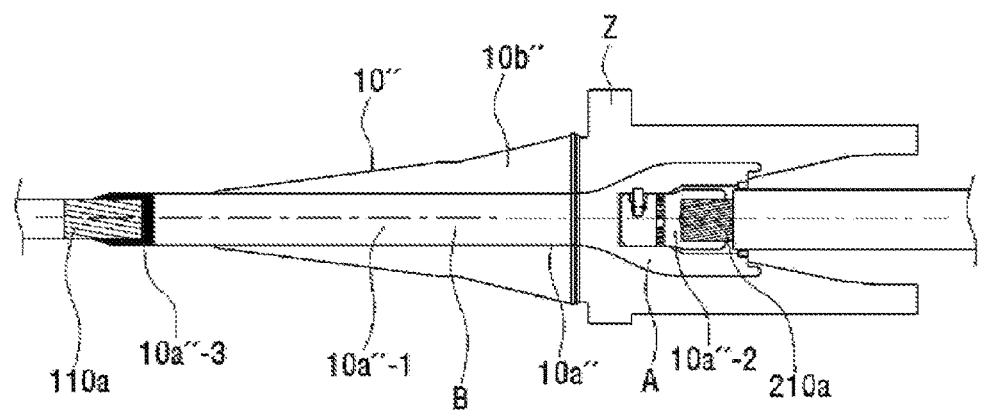
[Fig. 3]
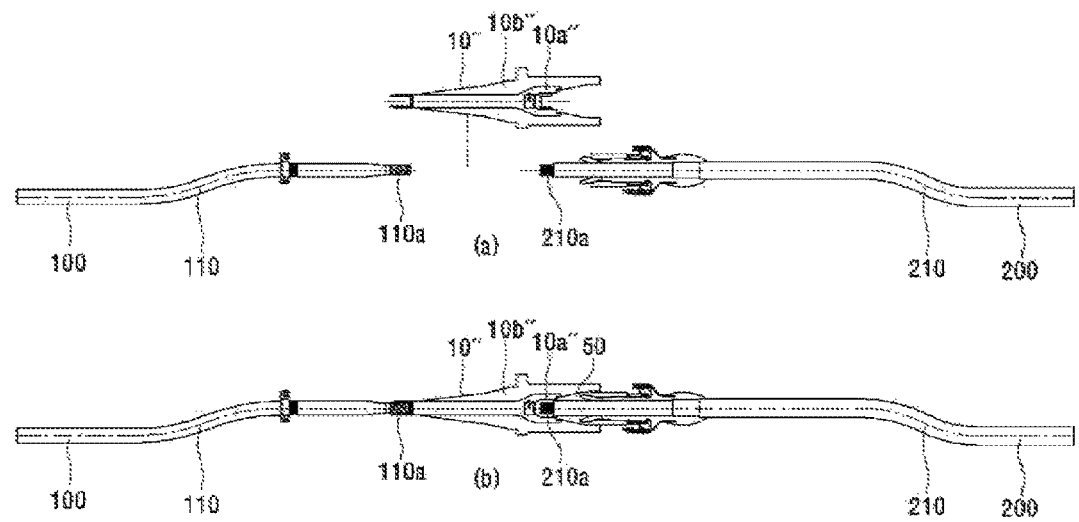

[Fig. 4]
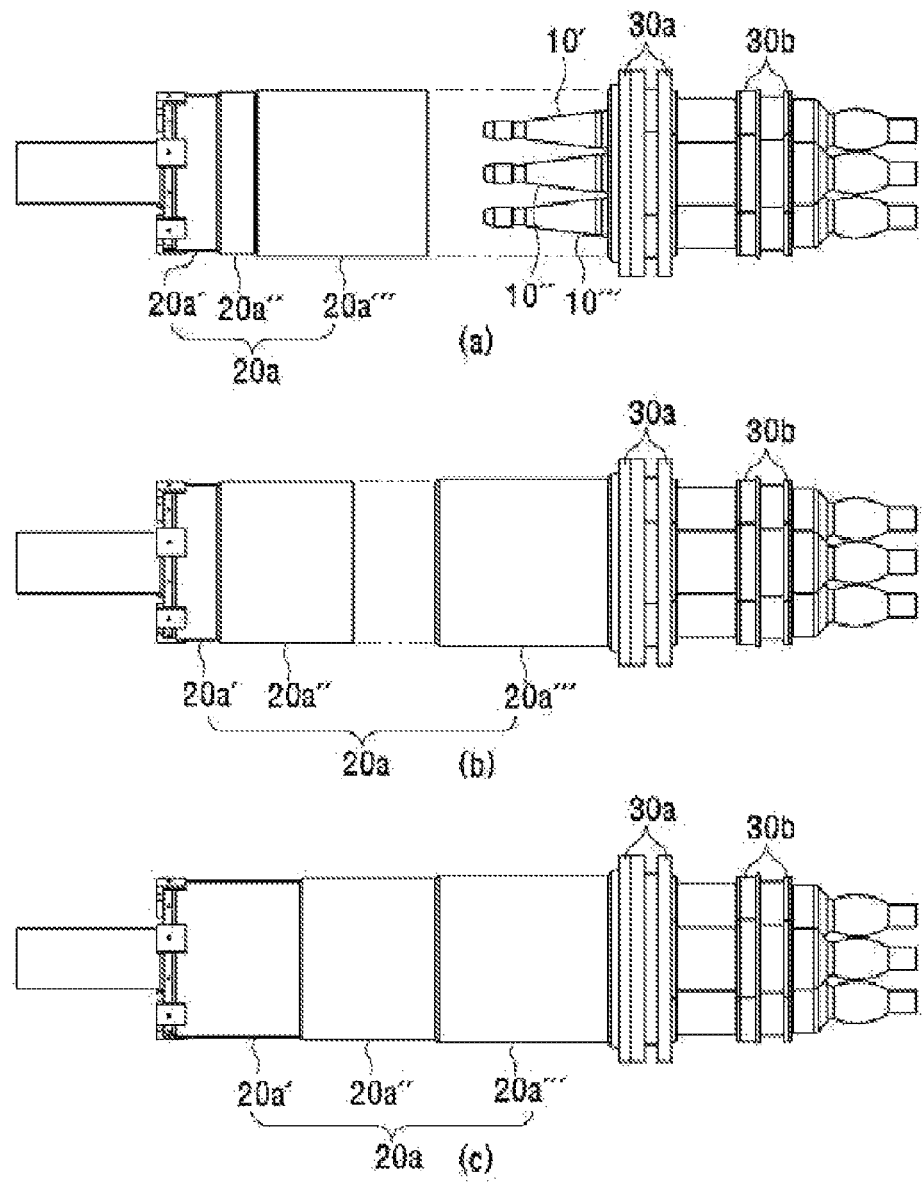

TRANSITION JOINT

BACKGROUND

Field

The present disclosure relates to a transition joint and more particularly to a transition joint capable of connecting a three core HPFF cable and a three core XLPE cable in a narrow manhole.

Description of the Related Art

An underground power cable for power transmission system is used as a power cable used for power transmission. Here, a joint is used to connect the power cables to each other. There are kinds of power cable mainly used, such as oil filled (OF) cable and crosslinked polyethylene (XLPE) cable. The OF cable uses a method of maintaining the insulation of Kraft paper by means of insulating oil. The insulating oil is filled in the OF cable, and incidental equipment for controlling the insulating oil pressure of the insulating oil is much required. For this reason, OF cable is not employed recently.

The OF cable can be largely divided into self-contained fluid-filled (SCFF) cable and high-pressure fluid-filled (HPFF) cable, depending on method of supplying the insulating oil.

In the SCFF cable, the insulating oil is supplied through a distribution channel formed within a paper-insulated conductor. In the HPFF cable, unlike the SCFF cable, a paper-insulated cable is installed within a metal pipe and the high pressure insulating oil is supplied to the whole metal pipe. This method has been developed long time ago and has been used. Recently, however, insulating oil leakage due to the corrosion of the metal pipe has a bad influence on the environment, so that the replacement of the metal pipe has become an important issue.

Unless existing installed cable is replaced, the HPFF cable requires the connection between the HPFF cables during cable line maintenance activities or small section connection.

The connection between the HPFF cable and the HPFF cable can be made by using, as in the past, a joint appropriate for the HPFF cable. However, the connection between the HPFF cable and an XLPE cable which is newly installed requires a joint having a new structure.

The joint having such a structure is referred to as a transition joint. There is a requirement for a structure for preventing the insulating oil present at a high pressure (500 Psi) within a metal pipe in which the HPFF cable has been laid from being transferred to the XLPE cable side.

Particularly, with regard to the transition joint, since, in most cases, a new type of a cable is installed and connected in a region where one type of a cable has been already installed, a manhole in which the cable has been installed is set in advance and the size or length of the manhole has been already determined. Therefore, it is important to develop a joint appropriate for the size of the narrow manhole.

SUMMARY

One embodiment is a transition joint which connects a three core HPFF cable and a three core XLPE cable, the transition joint including three epoxy units including an electrode which connects a conductor of the three core HPFF cable and a conductor of the three core XLPE cable at both ends of the electrode. Central portions of the three epoxy units are respectively connected in a triangular array to a metal flange which connects a protective tube constituting the joint.

Another embodiment is a transition joint which connects a three core HPFF cable and a three core XLPE cable, the transition joint including three epoxy units including an electrode which connects a conductor of the three core HPFF cable and a conductor of the three core XLPE cable at both ends of the electrode. The epoxy unit includes an epoxy molding part and an electrode bar formed at a center thereof. One end of the electrode bar is located outside the epoxy molding part and is connected to the respective conductors of the three core HPFF cable, and the other end of the electrode bar is located within the epoxy molding part and is connected to the respective conductors of the three core XLPE cable. A protruding epoxy flange is formed in a center of the epoxy unit and is positioned and fixed between two metal flanges. The epoxy units are connected in a triangular array at a center of the metal flange.

Further another embodiment is a transition joint which connects a three core HPFF cable and a three core XLPE cable, the transition joint including three epoxy units including an electrode which connects a conductor of the three core HPFF cable and a conductor of the three core XLPE cable at both ends of the electrode. The epoxy unit includes an epoxy molding part and an electrode bar formed at a center thereof. One end of the electrode bar is located outside the epoxy molding part and is connected to the respective conductors of the three core HPFF cable, and the other end of the electrode bar is located within the epoxy molding part and is connected to the respective conductors of the three core XLPE cable. An outer circumference of the epoxy unit is connected in a triangular array to metal flanges respectively. Three independent protective tubes are connected outside the three core XLPE cable, and one protective tube to which two or more cylindrical tubes are connected is connected outside the three core HPFF cable.

BRIEF DESCRIPTION OF THE DRAWINGS

FIG. 1a is a perspective view of a transition joint according to an embodiment of the present invention;

FIG. 1b is a view showing a process of assembling a third cylindrical tube after first assembling a first cylindrical tube and a second cylindrical tube of FIG. 1a;

FIG. 1c is a perspective view showing the inside of a state where a first protective tube has been separated in FIG. 1a;

FIG. 1d is a view showing an assembled state of one of three phases of FIG. 1a;

FIG. 2a is a cross sectional view of the transition joint according to the embodiment of the present invention;

FIG. 2b is an enlarged view of an epoxy unit of the cross sectional view of FIG. 2a;

FIG. 3 is a view referred to for describing a transition joint connection process according to the embodiment of the present invention; and FIG. 4 is a view referred to for describing a process in which three separate cylindrical tubes 20a', 20a", and 20a'" shown in FIG. 1a are connected.

DETAILED DESCRIPTION

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, a transition joint 1 according to the embodiment of the present invention will be described with reference to the accompanying drawings.

The transition joint 1 according to the embodiment of the present invention is designed to manufacture and develop a structure capable of connecting different kinds of cables of a three phase in a narrow manhole without problems.

In the embodiment of the present invention, an epoxy unit is installed in the center of the transition joint 1 such that insulating oil cannot move from a three core HPFF cable side to a three core XLPE cable side. As a result, it is possible not only to reinforce insulation but also to block the insulating oil.

According to the embodiment of the present invention, a structure in which three independent epoxy units can be assembled respectively to one flange is provided, thereby enabling a connecting process within a narrow manhole. Before the connecting process, separate protective tubes of the HPFF cable side, which have different inner diameters, are disposed so as to overlap on the side surface of the manhole in contact with the HPFF cable. As a result, the connection region can be obtained, and the protective tubes can be connected to each other by welding at one position while rotating the protective tube.

FIG. 1a is a perspective view of a transition joint 1 according to the embodiment of the present invention. FIG. 1b is a view showing a process of assembling a third cylindrical tube after first assembling a first cylindrical tube and a second cylindrical tube of FIG. 1a. FIG. 1c is a perspective view showing the inside of a state where a first protective tube has been separated in FIG. 1a. FIG. 1d is a view showing an assembled state of one of three phases of FIG. 1a. FIG. 2 is a cross sectional view of the transition joint 1 according to the embodiment of the present invention.

As shown in FIGS. 1a to 1d, the transition joint 1 according to the embodiment of the present invention may include epoxy units 10', 10", and 10''', protective tubes 20a and 20b, and flanges 30a, 30b, and 30c. As shown in FIG. 2a, the transition joint 1 according to the embodiment of the present invention may further include insulating paper 40, a stress cone 50, a pipe 60, a compression ring 70, and an insulating oil injection part 80. The transition joint 1 is used to connect different kinds of cables. According to the embodiment of the present invention, the transition joint 1 can connect the three core HPFF cable 100 and the three core XLPE cable 200.

The three core HPFF cable 100 and the three core XLPE cable 200 according to the embodiment of the present invention may be a power supply cable having a three core structure.

The three core HPFF cable 100 may include a first cable core 110 composed of a conductor 110a. The three core XLPE cable 200 may include a second cable core 210 composed of a conductor 210a.

The three core HPFF cable 100 and the three core XLPE cable 200 according to the embodiment of the present invention are an ultrahigh voltage cable. The transition joint 1 may connect different kinds of ultrahigh voltage cables of several tens to several hundreds of Kv.

Insulating oil 90 is filled in the three core HPFF cable 100 through the insulating oil injection part 80. Therefore, when the three core HPFF cable 100 and the three core XLPE cable 200 are connected, the insulating oil 90 may flow to the three core XLPE cable 200 side. Accordingly, there is a need to implement the transition joint 1 which completely blocks the insulating oil 90 from flowing and permeating into the three core XLPE cable 200.

The epoxy unit 10" connects the first cable core 110 constituting the three core HPFF cable 100 and the second cable core 210 constituting the three core XLPE cable 200 through a center electrode 10a" inserted into the center thereof. The first cable cores 110 and the second cable cores 210 are connected in a one-to-one correspondence manner to the epoxy units 10', 10", and 10''' respectively. While the embodiment of the present invention shows three epoxy units 10', 10", and 10''' connecting the three core HPFF cable 100 and the three core XLPE cable 200, the scope of the present invention is not limited to this. Each of the three epoxy units 10', 10", and 10''' is able to individually move forward and backward when connected to the cable for each phase.

Each of the epoxy units 10', 10", and 10''' includes, as shown in FIGS. 2a and 2b, the center electrode 10a" and an epoxy molding part 10b".

As shown in FIG. 2b, the center electrode 10a" connects the conductor 110a of the first cable core 110 and the conductor 210a of the second cable core 210. More specifically, the center electrode 10a" according to the embodiment of the present invention includes an electrode bar 10a"-1, a pin type sleeve 10a"-2, and a compression sleeve 10a"-3. That is, one end of the electrode bar 10a"-1 is connected to the conductor 110a of the first cable core 110 and compressed, and the other end of the electrode bar 10a"-1 is connected to the conductor 210a of the second cable core 210 and fastened in a type of a pin. For example, the electrode bar 10a"-1 includes a U-shaped portion "A" and a bar portion "B". The electrode 110a of the first cable core 110 may be directly inserted into the bar portion "B", and the electrode 210a of the second cable core 210 may be inserted into the U-shaped portion "A" through the pin type sleeve 10a"-2. Since the U-shaped portion "A" of the electrode bar 10a"-1 has a depressed shape, the electrode 210a of the second cable core 210 can be easily inserted into the U-shaped portion "A". As a result, the center electrode 10a" can be completely blocked from the insulating oil 90. The other end of the electrode bar 10a"-1 is located within the epoxy molding part 10b", so that the entire length of the transition joint 1 can be reduced. Besides, each of the three epoxy units 10', 10", and 10''' matches the number of cable cores and is able to independently move horizontally, so that a process of connecting different kinds of three core cables can be performed in accordance with the length of an already installed narrow manhole.

On the basis of the electrode bar 10a"-1, the compression sleeve 10a"-3 is located at the three core HPFF cable 100 side, and the pin type sleeve 10a"-2 is located at the three core XLPE cable 200 side. The compression sleeve 10a"-3 is located outside the epoxy molding part 10b", and the pin type sleeve 10a"-2 is located inside the epoxy molding part 10b".

In the epoxy molding part 10b" of the three core HPFF cable 100 side, mutual insulation reinforcement is made through the insulating paper and the inclined surface. In the three core XLPE cable 200 side, the insulation reinforcement is made on the stress cone 50 and connection between the conductors is made within the three core XLPE cable 200. This can be a connection process capable of reducing the length of the transition joint 1.

The epoxy molding part 10b" may be implemented in the form of surrounding the outer wall of the center electrode 10a" in order to block the center electrode 10a" from the insulating oil 90. Specifically, the insulating oil 90 can be blocked so as not to permeate the center electrode 10a" and the three core XLPE cable 200 from the insulating paper 40 impregnated with the insulating oil.

As shown in FIG. 2a, the center electrode 10a" connects the conductor 110a of the first cable core 110 and the conductor 210a of the second cable core 210, and the epoxy molding part 10b' is implemented in the form of surrounding the outer wall of the center electrode 10a". Therefore, the insulating oil 90 of the HPFF cable 100 side can be completely prevented from being transferred to the XLPE cable 200 side.

In the embodiment of the present invention, particularly, each of the epoxy units 10', 10", and 10'" is independently assembled and is separable. Accordingly, when repair/modification of one epoxy unit 10" is required, there is no need to repair/modify another epoxy unit 10'". Therefore, time and cost required for recovery can be reduced.

The protective tube 20 according to the embodiment of the present invention may include a first protective tube 20a for covering the three core HPFF cable 100 side and a second protective tube 20b for covering the three core XLPE cable 200 side. The first protective tube 20a may be composed of a plurality of cylindrical tubes 20a', 20a", and 20a'.

According to the embodiment of the present invention, the first one protective tube 20a formed by connecting the plurality of cylindrical tubes 20a', 20a", and 20a'" is disposed outside the three core HPFF cable 100. Also, three independent second protective tubes 20b', 20b", and 20b'" are disposed outside the three core XLPE cable 200.

Each of the cylindrical tubes 20a', 20a", and 20a'" can be individually separated. The cylindrical tubes 20a', 20a", and 20a'" may be implemented as a stack structure in which one cylindrical tube is partially overlapped with other cylindrical tubes. Here, the circumferences of the respective cylindrical tubes may be different from each other. Therefore, it is possible that, after some of the cylindrical tubes are assembled first, the cable is connected and the cable is covered with the remaining cylindrical tubes. As a result, the cable can be connected even in a narrow space. For example, as shown in FIG. 1b, the assembly can be completed by a process in which, after the two cylindrical tubes 20a' and 20a" are assembled first, the cable is connected and the cable is covered with the remaining cylindrical tube 20a'". According to the embodiment of the present invention, there is an advantage that the cable can be connected even in a narrow space of about 14 cubic feet (4.3 m$^2$).

The flange 30 may include the first flange 30a which is connected to the first protective tube 20a and the second protective tube 20b, and the second flange 30b which is disposed on the second protective tube 20b. Also, the flange 30 may include the third flange 30c fastened to the first flange 30a. The first flange 30a and/or the second flange 30b may be formed in plural numbers. The plurality of first flanges 30a may be implemented to have the same size or different sizes. Also, the plurality of second flanges 30b may be implemented to have the same size or different sizes.

As shown in FIG. 1c, the plurality of epoxy units 10', 10", and 10' are fitted to the first flange 30a. Specifically, the central portions of the three epoxy units 10', 10", and 10'" may be respectively connected in a triangular array to the first flange 30a which connects the first protective tube 20a and the second protective tube 20b. Here, the plurality of epoxy units 10', 10", and 10' fitted to the first flange 30a may be arranged on the concentric circle of the first flange 30a at an equal interval (120°). A protruding epoxy flange Z is formed on the central portion of the one epoxy unit 10'". The epoxy flange Z may be positioned and fixed between two first flanges 30a' and 30a". While the plurality of epoxy units 10', 10", and 10'" pass together through the first flange 30a, the second protective tube 20b covering the single epoxy unit 10" can pass through the second flange 30b. Although FIG. 1 shows that the first protective tube 20a is composed of three cylindrical tubes, the scope of the present invention is not limited to this. The stress cone 50 is fixed in the form of surrounding the outside of the front end of the second cable core 210. An external force is applied toward the front end of the second cable core 210 through the pipe by the compression ring 70, so that the stress cone 50 may be inserted into the epoxy unit 10".

FIG. 3 is a view referred to for describing the transition joint 1 connection process according to the embodiment of the present invention.

The conductors 110a and 210a and an insulation layer are exposed by cutting the three core HPFF cable 100 and the three core XLPE cable 200 respectively, and then the length of each of both of the cables is set. The three cylindrical tubes 20a', 20a", and 20a'" are inserted into the three core HPFF cable 100 side. The compression ring 70, the stress cone 50, and the three second protective tubes 20b', 20b", and 20b'" are inserted into each of the three core XLPE cables 200 to the three core XLPE cable 200 side. The first protective tube 20a and the second protective tube 20b are connected and fixed through the first flange 30a.

As shown in (a) of FIG. 3, the first epoxy unit 10" is set and the conductors 110a and 210a of both of the cables are, as shown in (b) of FIG. 3, inserted into the first epoxy unit 10". Also, insulation is reinforced on both the cables. For example, the insulating paper 40 is wound around the three core HPFF cable 100 side and the interface bonding of the stress cone 50 and/or control process of the compression ring 70 are/is performed on the three core XLPE cable 200 side, so that the insulation reinforcement is made. Then, the insertion of both conductors and insulation reinforcement are repeatedly performed on the second epoxy unit 10' and the third epoxy unit 10'" as well.

An aluminum sheathing is performed between the three core XLPE cable 200 and the second protective tube 20b. The positions of the three protective tubes 20a', 20a", and 20a'" of the three core HPFF cable 100 side are controlled and welded to complete the transition joint 1.

FIG. 4 is a view referred to for describing a process in which the three separate cylindrical tubes 20a', 20a", and 20a'" shown in FIG. 1a are connected.

As shown in FIG. 1a, the first protective tube 20a disposed outside the three core HPFF cable 100 has a shape in which the three separate cylindrical tubes 20a', 20a", and 20a''' are connected. The three separate cylindrical tubes 20a', 20a", and 20a''' have an inner and outer diameters that enable themselves to be overlapped with each other. As shown in (a) of FIG. 4, the three separate cylindrical tubes 20a', 20a", and 20a''' are inserted into the three core HPFF cable 100 side before the connection process, and the three separate cylindrical tubes 20a', 20a", and 20a''' are overlapped with each other and disposed on the sidewall within the manhole, so that a connection process area of the three core HPFF cable side can be obtained. Also, as shown in (b) and (c) of FIG. 4, the cylindrical tubes 20a', 20a", and 20a''' are sequentially connected to the three core XLPE cable 200 side, and then the connection process is completed.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although preferred embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A transition joint which connects a three core HPFF cable and a three core XLPE cable, the transition joint comprising three epoxy units comprising an electrode which connects a conductor of the three core HPFF cable and a conductor of the three core XLPE cable at both ends of the electrode,
   wherein central portions of the three epoxy units are respectively connected in a triangular array to a metal flange which connects a protective tube constituting the joint,
   wherein each of the three epoxy units is movable individually forward and backward when connected to the transition joint for each phase,
   wherein the three epoxy units include epoxy molding parts and electrode bars formed at centers thereof, the electrode bars including:
      first ends located outside the epoxy molding part and connected to the conductors of the three core HPFF cable respectively and compressed, and
      second ends located within the epoxy molding part and connected to the conductors of the three core XLPE cable respectively and fastened in a type of pin, and
   wherein the first ends of the electrode bars are connected to the conductors of the three core HPFF cable respectively by the forward and backward movement of the three epoxy units.

2. A transition joint which connects a three core HPFF cable and a three core XLPE cable, the transition joint comprising three epoxy units comprising an electrode which connects a conductor of the three core HPFF cable and a conductor of the three core XLPE cable at both ends of the electrode,
   wherein each of the three epoxy units is movable individually forward and backward when connected to the transition joint for each phase,
   wherein each epoxy unit comprises an epoxy molding part and an electrode bar formed at a center thereof,
   wherein a first end of the electrode bar is located outside the epoxy molding part and is connected to the respective conductors of the three core HPFF cable by the forward and backward movement and compressed, and a second end of the electrode bar is located within the epoxy molding part and is connected to the respective conductors of the three core XLPE cable and fastened in a type of pin,
   wherein a protruding epoxy flange is formed in a center of the epoxy unit and is positioned and fixed between two metal flanges,
   and wherein the epoxy units are connected in a triangular array at a center of the metal flange.

3. The transition joint of claim 2,
   wherein the second end of the electrode bar is located within the epoxy molding part, thereby reducing an entire length of the transition joint, so that an entire length of the transition joint is reduced,
   and wherein each of the three epoxy units matches a number of cable cores of three core cables and is independently movable horizontally, so that a process of connecting different kinds of three core cables is performable in accordance with a length of an already installed narrow manhole.

4. A transition joint which connects a three core HPFF cable and a three core XLPE cable, the transition joint comprising three epoxy units comprising an electrode which connects a conductor of the three core HPFF cable and a conductor of the three core XLPE cable at both ends of the electrode,
   wherein the epoxy unit comprises an epoxy molding part and an electrode bar formed at a center thereof,
   wherein the epoxy unit is movable individually forward and backward when connected to the transition joint for each phase,
   wherein a first end of the electrode bar is located outside the epoxy molding part and is connected to the respective conductors of the three core HPFF cable by the forward and backward movement of the epoxy unit and compressed, and the other end of the electrode bar is located within the epoxy molding part and is connected to the respective conductors of the three core XLPE cable and fastened in a type of a pin,
   wherein an outer circumference of the epoxy unit is connected in a triangular array to metal flanges respectively,
   and wherein three independent protective tubes are connected outside the three core XLPE cable, and one protective tube to which two or more cylindrical tubes are connected is connected outside the three core HPFF cable.

5. The transition joint of claim 4,
   wherein the protective tube disposed outside the three core HPFF cable has a shape in which three separate cylindrical tubes are connected,
   and wherein the three separate cylindrical tubes have an inner and outer diameters that enable themselves to be overlapped with each other.

6. The transition joint of claim 5,
wherein the three separate cylindrical tubes are inserted into the three core HPFF cable side before the connection process,
and wherein the three separate cylindrical tubes are overlapped with each other and disposed on a sidewall within the manhole, so that a connection process area of the three core HPFF cable side is obtained.

\* \* \* \* \*